HENRY R. SWANK, OF WEST JERSEY, ILLINOIS.

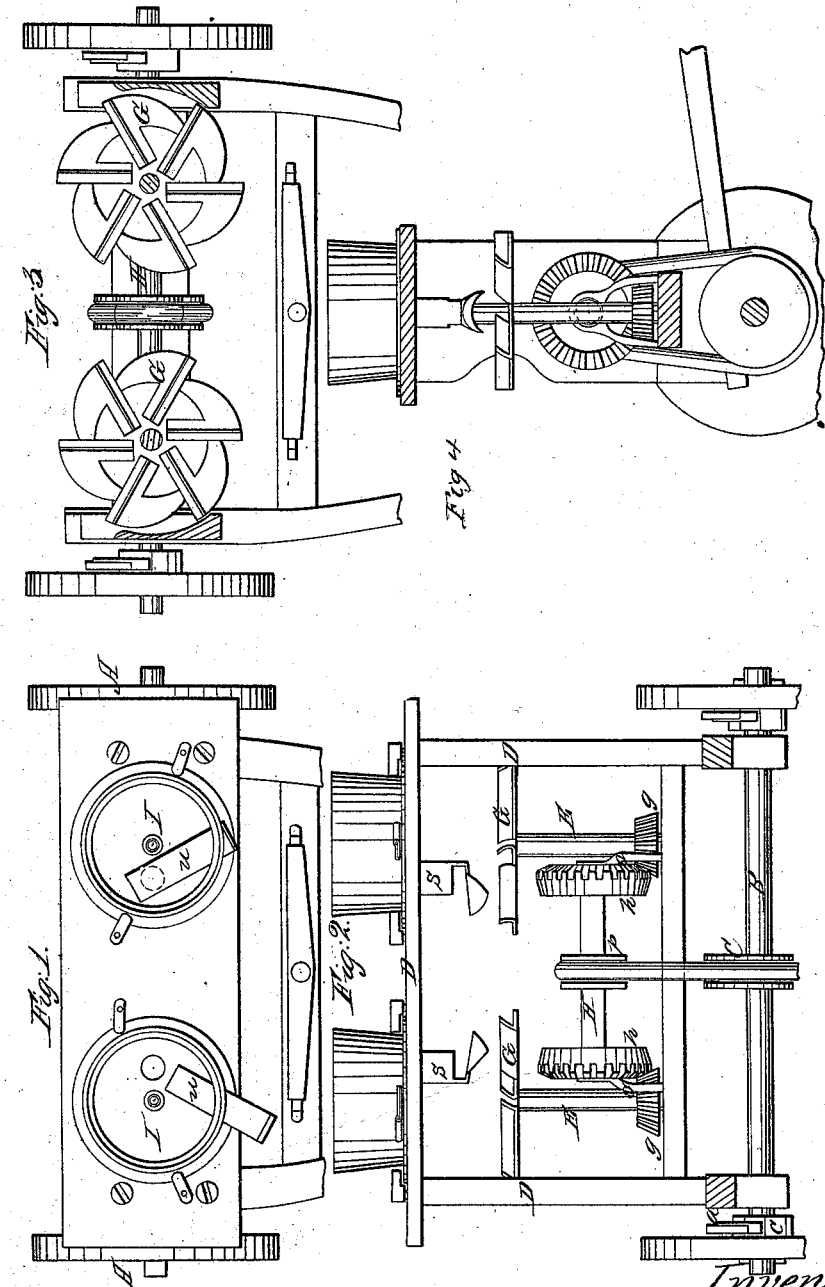

Letters Patent No. 87,726, dated March 9, 1869.

IMPROVEMENT IN SEED-SOWER.

The Schedule referred to in these Letters Patent and making part of the same.

*To all whom it may concern:*

Be it known that I, HENRY R. SWANK, of West Jersey, in the county of Stark, and State of Illinois, have invented a new and valuable Improvement in Seed-Sowers; and I do hereby declare that the following is a full, clear, and exact description of the construction and operation of the same, reference being had to the annexed drawings, making a part of this specification, and to the letters and figures of reference marked thereon.

Figure 1 of the drawings is a plan view of my seed-sower;

Figure 2 is a front view;

Figure 3 is a plan view with the top removed; and

Figure 4 is a side view with side posts removed.

My invention relates to that class of machines constructed for the purpose of sowing grain in the manner known as "broadcast;" and the object thereof is to provide, for the use of agriculturists, more perfect means than have heretofore been devised for accomplishing the results desired.

My broadcast seed-sower is constructed in the sulky-form, the wheels of which are marked A on the drawings, and letter B is the axle-tree, with a grooved drum thereon at the point C.

The inner sides of the wheels respectively have pawls marked a, which operate in cogged wheels on the axle-tree, marked c.

The frame of my sower is shown on fig. 2 by the letter D. It consists in two upright posts, adjusted on the top of the sulky-shafts, immediately over the axle-tree, and a top and bottom bar, as represented.

The letters E are two upright shafts, extending upward from the bottom bar of the frame to the top bar thereof, in each of which they are adjusted in such manner as to allow them to rotate.

The letters G are the sowers arranged upon the shafts E, as shown. These sowers are represented fully on fig. 3, and their office is to scatter the seed in all directions, except sidewise, as the said shafts are rotated.

The upright sides of the frame are made wide enough to prevent the seed from being thrown outward, thereby securing a uniform width of sowing at each passage of the sowing-machine.

The letters g are cogged wheels attached to the lower ends of shafts E, that mesh with and are actuated by the cogged wheels h, hereinafter mentioned.

The letter H is a shaft adjusted in the apex of the small iron frame o, which said frame has its base upon the bottom bar of the main frame.

The cogged wheels h and grooved drum p are arranged on this last-named shaft, in the manner shown, the wheels operating with the wheels g, as above mentioned, and the drum operating with the drum C, by means of a belt, as represented.

The letters I are hoppers adjusted upon the upper cross-bar of the frame D, and have conductors connected therewith, respectively marked s.

Letters u are slides arranged in the bottom of the hoppers, immediately over the aperture leading to the conductors, and are designed to shut the seed off from the conductors, or allow it to flow therein, at the will of the operator. Small lugs are placed in the bottom of the hoppers, under which the slides are operated.

To sow grain with my device, the hoppers are filled, and the team is started, the slides in the mean time having been drawn outward, so as to allow the seed to pass to the conductors. As the wheels of the sulky revolve, the drum C, with the connecting-belt, rotates the drum p, and with it the shaft H and cogged wheels h. These wheels in turn actuate the shaft E by means of their connection with cogged wheels g, and with them the sowers G. The grain in the mean time is falling on said sowers, through the conductors, and is scattered broadly over the track represented by the insides of the side bars of the main frame.

The wings, or raised flanches of the sower, serve to give great force to the seed as it leaves the sower, and to scatter it evenly over a great breadth of ground.

The pawl a and cogged wheels c serve to secure a rotary movement to the axle-tree, and enable the operator to throw the working-machinery out of gear whenever it is desirable so to do.

I am aware that the devices herein described are not severally and independently new, for many, if not all of them, have been used in other combinations; but

What I claim as my invention, and desire to secure by Letters Patent, is—

A broadcast seed-sower, having cogged wheels c, g, and h, pawl a, shafts E and H, drums C and p, sowers G, conductors s, and slides u, constructed and arranged substantially as herein specified.

In testimony that I claim the above, I have hereunto subscribed my name, in the presence of two witnesses.

HENRY R. SWANK.

Witnesses:
 FRANK PURPLE,
 GEO. PUTERBAUGH.